United States Patent
Ober

[15] 3,657,865
[45] Apr. 25, 1972

[54] RIDING LAWN MOWER AND LEAF SHREDDER

[72] Inventor: Howard C. Ober, 31070 Shaker Boulevard, Cleveland, Ohio 44124

[22] Filed: Sept. 24, 1969

[21] Appl. No.: 860,550

[52] U.S. Cl. ............................. 56/13.3, 56/14.5, 56/16.6, 56/320.2
[51] Int. Cl. ....................................................... A01d 45/20
[58] Field of Search ..................... 56/23, 25.4, 255, 194, 202, 56/14.5, 13.4, 13.3, 16.4, 16.6, 320.2, 15.6

[56] References Cited

UNITED STATES PATENTS

| | | | |
|---|---|---|---|
| 3,229,451 | 1/1966 | Wenzel et al. | 56/15.6 |
| 2,701,942 | 2/1955 | Caldwell, Jr. et al. | 56/255 |
| 2,726,503 | 12/1955 | Phelps | 56/25.4 |
| 2,827,749 | 3/1958 | Patten | 56/23 X |
| 2,843,991 | 7/1958 | Poehls | 56/23 |
| 2,877,616 | 3/1959 | Gewalt et al. | 56/25.4 X |
| 2,953,888 | 9/1960 | Phillips, Jr. et al. | 56/25.4 |
| 3,037,339 | 6/1962 | Nicholson | 56/202 X |
| 3,191,367 | 6/1965 | Schwalm | 56/25.4 X |
| 3,080,696 | 3/1963 | Wood | 56/25.4 |
| 3,199,277 | 8/1965 | Moody | 56/25.4 |
| 3,316,696 | 5/1967 | Florido | 56/25.4 |

*Primary Examiner*—Louis G. Mancene
*Assistant Examiner*—J. A. Oliff
*Attorney*—John Harrow Leonard

[57] ABSTRACT

A self-propelled riding type rotary lawn mower and shredder in which grass clippings and leaves are shredded within the rotary blade housing and discharged therefrom to a power driven rotary impeller which is driven by the engine of the mower. The impeller drives the shredded material into and along an overhanging chute which directs the material into an open top receptacle, such as a garbage receptacle, carried on the rear of the mower. Provision is made for directing, selectively, all or part only of the shredded material to the impeller, the remainder thereof being discharged onto the ground in the normal manner.

8 Claims, 3 Drawing Figures

INVENTOR
Howard C. Ober
BY John H. Leonard
his ATTORNEY

RIDING LAWN MOWER AND LEAF SHREDDER

This invention relates to a riding type rotary lawn mower and shredder which operates to cut grass in the usual manner, and functions also to shred the grass clippings and to pick up and shred leaves, and to discharge, all or any selected portion of the shredded material into a readily removable receptacle supported on the mower chassis.

Heretofore, the grass clippings discharged from upright spindle rotary mowers by the blades are thrown outwardly directly from the blade housing through a lateral inverted discharge trough of the housing by the air blast and force imparted by the blade.

Some such mowers are provided with a receptacle in the form of a flexible bag or net having an inlet neck detachably connected to the outlet of the trough and into which the clippings pass as they are discharged from the trough. Such receptacles must be specially designed for the particular mower, and substantially all of the clippings discharge thereinto. Such receptacles must be removed for emptying.

In those cases in which the mower is provided with two rotary blades, the clippings generally are discharged laterally from the housing through openings in the peripheral wall thereof, one opening near a forward corner of the housing at one side thereof and the other near a rear corner of the housing at the opposite side of the housing. These clippings are discharged directly onto the lawn being mowed.

In accordance with the present invention the mower is provided with a rear support on which a conventional garbage receptacle is detachably supported. An inverted trough leads from the rear discharge opening of the mower housing to an impeller positioned near the ground level. The impeller drives the air and suspended clippings rearwardly and upwardly along the trough which discharges the clippings downwardly into the receptacle. A disposable plastic bag is disposed in the receptacle for receiving the shredded material. The receptacle itself can be readily lifted from the mower, if desired, emptied, and replaced as it does not require special fastenings and the like.

For mowing, shredding, and combined mowing and shredding, the mower employed is of the multi-blade type having a plurality of blades disposed in a single housing and rotatable about upright axes. The housing is modified so as to cause grass clippings and leaves picked up by the action of the blades to remain in the housing for an interval sufficiently long to assure such repeated contact with the blades that the clippings and leaves are shredded by the blades prior to discharge from the housing.

An important feature is to control the discharge from the housing so that none, or any portion, of the shredded material is discharged directly onto the lawn, as desired.

Another specific feature is a power transmission arranged for driving the impeller by the same motor which drives the rotary blades and the driving wheels of the mower.

Various other objects and advantages of the invention will become apparent from the following description wherein reference is made to the drawings, in which.

Figure 1:
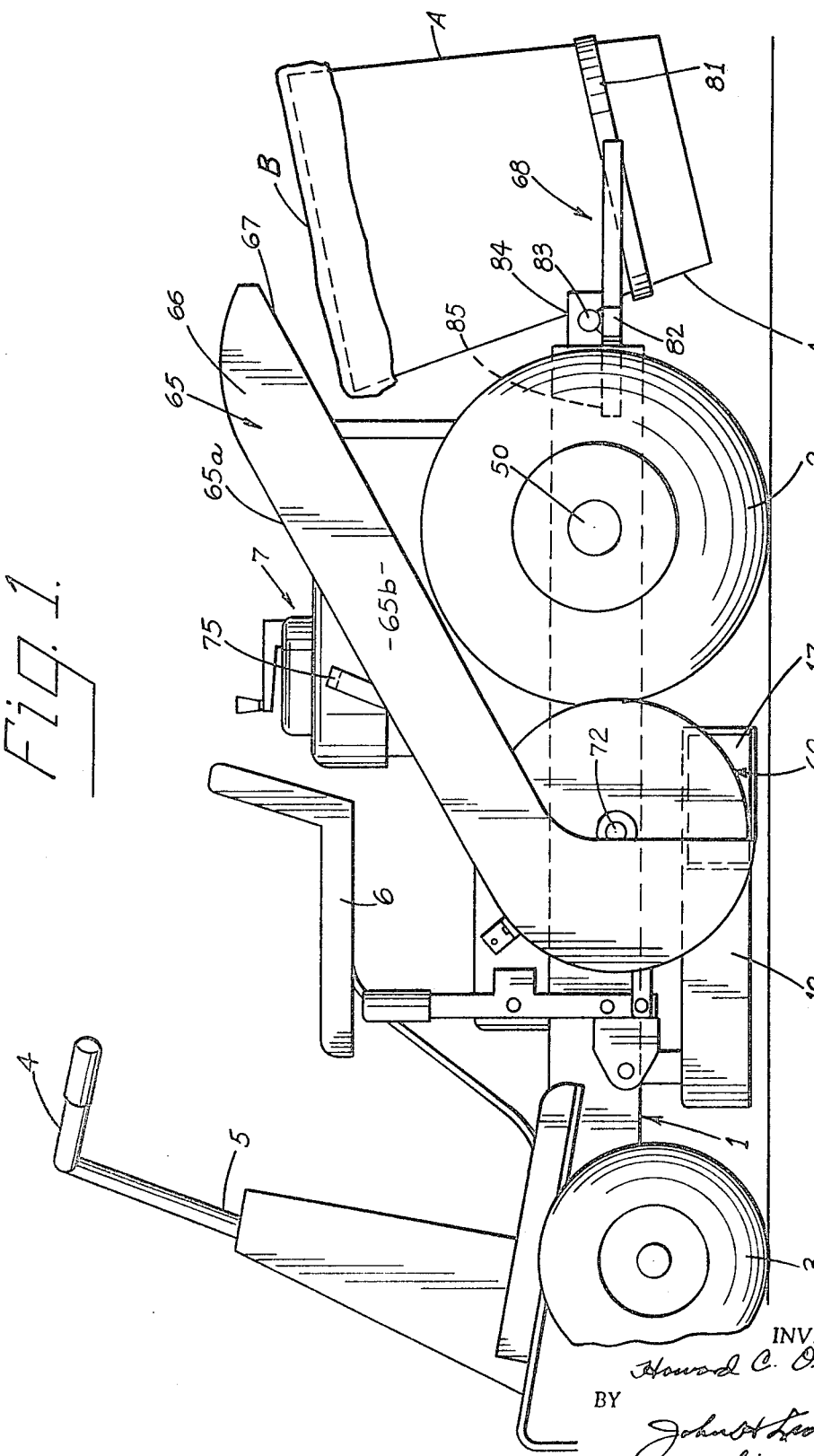
FIG. 1 is a side elevation of a mower embodying the principles of the present invention.

Referring to the drawings, the mower comprises a chassis or frame 1 which is supported at the rear by suitable drive wheels 2 and at the front by dirigible wheels 3 which are steered by suitable handle bars 4 connected to the wheels by a steering post 5. The mower has the usual seat 6 for the operator. At the rear of the seat, the chassis supports a gasoline engine 7 with its drive shaft 8 disposed vertically.

Figure 2:
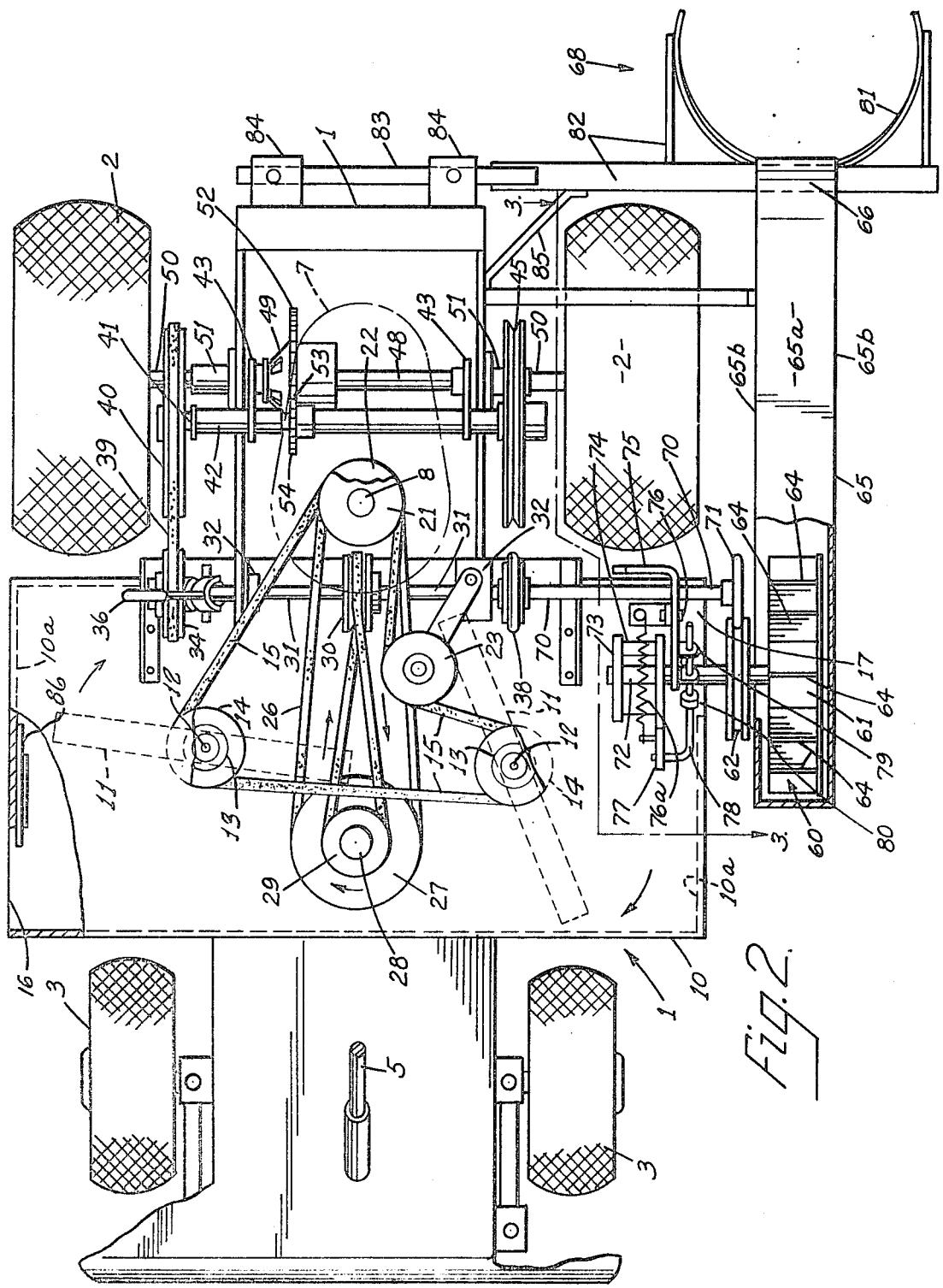
FIG. 2 is a top plan view of the mower chassis and impeller of the mower showing the power transmission to the various operating parts of the mower and to the impeller.
Figure 3:
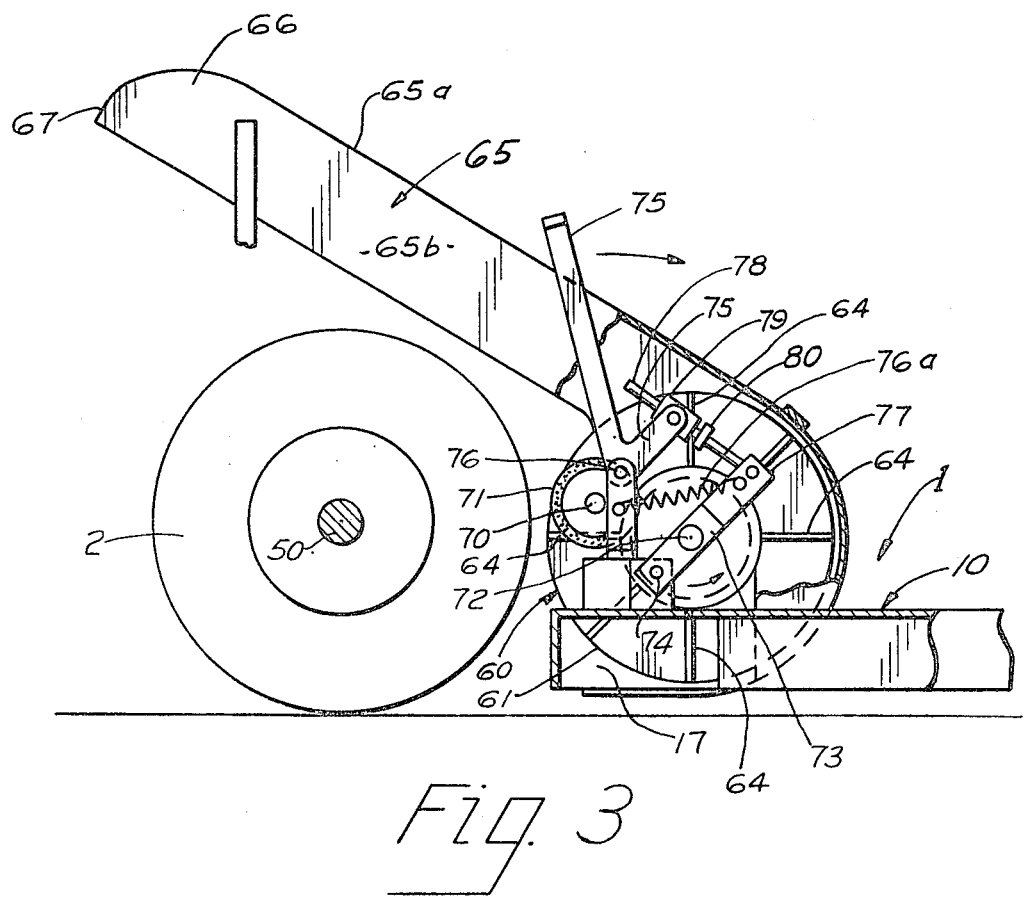
FIG. 3 is an enlarged fragmentary vertical sectional view showing the impeller and its discharge trough, and manner of conveying the clippings to the container, and is taken on line 3—3 of FIG. 2.

Carried on the underside of the chassis 1 is a housing 10 having a depending peripheral wall 10a which encloses a pair of rotary blades 11. The blades are carried on suitable upright shafts 12 mounted in upright bearings 13 on the chassis. Driving pulleys 14 are secured to the upper ends of the shafts 12, respectively, and are driven by a common belt 15 which rotates both blades clockwise, as viewed in FIG. 2.

The opposite sides of the peripheral wall 10a of the housing have front and rear discharge openings 16 and 17, respectively. The front opening 16 is in the right-hand side wall portion of the housing adjacent the front of the housing and the rear opening 17 is in the left-hand side wall portion of the housing near the rear of the housing.

In order to drive the blades and also propel the mower, the vertical drive shaft 8 of the engine carries pulleys 21 and 22. The pulley 21 is drivingly connected to the belt 15 for driving the blades, and an idler pulley 23 is provided for tightening the belt for proper driving engagement with the pulleys 14 and 21. The idler is settable by a conventional lever and detent, not shown.

For driving the drive wheels 2, the pulley 22 is connected by a belt 26 to a forward pulley 27 which is mounted on an upright shaft 28 supported in a suitable bearing on the chassis. Mounted on the shaft 28 for rotation therewith is a pulley 29 which is drivingly connected to a pulley 30 on a jack shaft 31. The jack shaft 31 is mounted in suitable bearings 32 on the chassis. At one end the jack shaft 31 carries a variable speed adjustable V-belt drive pulley 34 which is settable for selected speeds by a conventional lever 36.

Also mounted on the jack shaft 31 for rotation therewith is a reversing friction drive roller 38. The variable speed drive pulley 34 is drivingly connected by a belt 39 to a pulley 40 which is mounted on a second jack shaft 41. The jack shaft 41 is rotatably supported in suitable coaxial bearing sleeves 42 which are secured fixedly in coaxial relation to each other and which are mounted on rocker arms 43. At the end of the shaft 41 opposite from the pulley 40, the shaft is provided with a reversing friction wheel 45. By rocking the bearing sleeves 42 rearwardly, the belt 39 is tightened and the driving of the jack shaft 41 by the jack shaft 31 is effected through the pulleys 34 and 40, and also the wheel 45 is held out of engagement with the friction drive roller 38. When the sleeve 42 is rocked forwardly, the belt 39 is loosened so as to no longer effect the driving relation between the pulleys 34 and 40, and the friction driving wheel 45 is frictionally engaged for driving by the drive roller 38. The arms 43 are rockably mounted on a sleeve 48, which carries a differential 49 which drives a drive shaft 50 on which are mounted the driving wheels 2.

The shaft 50 is mounted in suitable bearings 51 on the chassis. The differential 49 has a sprocket 52 which is drivingly connected by a chain 53 to a sprocket 54 on the shaft 41. A shift lever is provided for rocking the sleeve 42 for reversing the drive of the wheels, as described. The lever is connected to the sleeve 42 for swinging it forwardly and rearwardly and to reverse and forward positions. This specific shift lever and its connection are omitted for clearness as they form no part of the present invention.

Upon operation of the mower blades, the grass trimmings are directed outwardly through the passages 16 and 17.

The structure thus far described, except for the specific power driving mechanism, is known in the art.

Mounted on the chassis 1 is a rotary impeller 60 comprising, in general, a cylindrical rotor 61 to which a friction driving pulley 62 is affixed in coaxial relation. The rotor 61 carries a plurality of radial blades 64 and is positioned so that the clippings being discharged from the passage 17 are directed into the impeller from the inner end thereof within the radial limits of the blades 64 at the upward travel portion of their path. The clippings and the air in which they are suspended are immediately impelled by the blades upwardly.

A suitable open bottom guard and chute 65, having a top wall 65a and dependent side walls 65b, is carried by the chassis and extends upwardly to the upper level of the impeller and thereabove and continues rearwardly, as indicated at 66, to its discharge end 67. The discharge end 67 is directed downwardly at the rear of the chassis 1 so as to discharge into a garbage receptacle A which is detachably supported on a support 68 rearwardly of the chassis 1 beyond the wheels 2. The receptacle A preferably holds a disposable bag B for receiving the clippings.

In order to drive the impeller 60, the jack shaft 31 is provided with an extension 70 on the end of which is a friction driving roller 71. The roller 71 engages the driving pulley 62 of the impeller. The impeller 60 and pulley 62 are supported on a shaft 72 which is carried on a rockable support 73 which is connected to the chassis by a rock shaft 74. The support 73 is rocked about the shaft 74, thereby moving the pulley 62 selectively into and out of frictional driving relation with the frictional roller 71.

For rocking the support to connect the pulley 62 and roller 71 for driving the impeller, and for disconnecting the pulley 62 and roller 71, selectively, a spring biased lever 75 is rockably mounted on a pivot 76 on the chassis. A spring 76a is connected at one end to the chassis and at the other end to a bracket 77 of the support 73 and biases the pulley 62 into driven relation to the roller 71.

The lever is connected to the bracket 77 of the support 73 by a rod 78 which is pivotally connected at one end to the bracket 77. At the opposite end the rod 78 is slidably accommodated in a yoke 79 pivoted on the lever 75. The rod carries an adjustable collar 80 which can be adjusted to position to swing the support 73 against the bias of the spring 76a to a position in which the pulley 62 is disconnected from the roller 71. The rod and lever connection is of the dead-center type so as to hold the impeller disconnected when the lever is shifted to an Off position.

The support 68 comprises an annular band 81 supported on an arm 82 connected to a rod 83 fastened in brackets 84 on the rear of the chassis 1 and reinforced by a stay brace 85. The support supports the receptacle A in a slightly forwardly tilted position with its open upper end beneath the outlet 67 of the chute 66.

With the structure thus described, the mower can be operated in a conventional manner so that all of the grass clippings and leaves are discharged concurrently at the forward right-hand corner of the housing 10 and the rearward left-hand corner. In such a case, the impeller 60 is not operated. However, if it is desired for any reason to remove only part of the grass clippings from a lawn, the impeller 60 can be engaged for driving in which case about one-half of the clippings will be discharged through the passage 16 and the other half through the passage 17 to the impeller and thereby propelled to the container A.

In many cases it is desirable that substantially all, or more than half, of the clippings be discharged into the receptacle and that they be shredded. Also, it is desirable that all or part of the leaves on the lawn be picked up, shredded, and discharged into the collecting receptacle, either during mowing or as a separate leaf removing operation.

To render the combined mower and shredder effective for such shredding and removal of leaves, as well as of clippings or clippings and leaves combined, a damper 86 is provided for adjusting the effective size of the forward discharge opening 16, thereby controlling the discharge therefrom and also, as a result, controlling the discharge from the rearward opening 17. If the damper is fully closed, substantially all grass clippings are discharged through the opening 17, and all clippings and leaves are delayed in the passage through and from the housing for an interval such that they are repeatedly struck by the blades and shredded. By regulating the damper 86, the proportion of clippings, or of leaves, or of clippings and leaves, discharged onto the lawn is controlled, all clippings and leaves being discharged onto the lawn if the damper 86 is fully open and substantially all being discharged to the impeller if the damper 86 is fully closed. The proportion discharged directly onto the lawn is progressively reduced as the damper is progressively closed.

Since the clippings and leaves cannot then escape through the passage 16, they are carried around by the right-hand blade 11 and thrown into the left-hand blade and thus further cut and chopped, prior to discharge from the left-hand blade through the passage 17 into the impeller and thence into the receptacle A.

Full closure of the damper 86 is preferred for removing and shredding leaves as a separate leaf removal operation.

Having thus described my invention, I claim:

1. In a propelled rotary cutter;
    a wheel supported chassis;
    an open bottom housing having a top wall and a peripheral wall depending from the top wall;
    power driven cutting means carried by the chassis and disposed in the housing and rotatable in a generally horizontal plane and operative to cut material and propel the cut material and air outwardly toward and along said peripheral wall;
    a power driven rotary impeller carried by the chassis and rotatable about a generally horizontal axis, said impeller having a plurality of blades extending outwardly relative to, and spaced from each other circumferentially of, the axis of the impeller in a row of which one side faces generally toward said peripheral wall of the housing;
    said peripheral wall having two discharge openings therein spaced apart from each other peripherally of the housing for causing preselected portions of the mixture of air and cut material thrown outwardly by the cutting means to be discharged laterally from the housing through one of said openings directly into the atmosphere outside of the housing, and other portions to be discharged through the other of said openings directly into said impeller;
    each of said openings facing toward that portion of the path of the cutting means which is nearest to it and in which the cutting means are on-coming relative to it;
    a discharge chute enclosing said blades of the impeller and having an outer peripheral wall extending along the path of the outer periphery of the row of impeller blades at the upwardly traveling portion of said path and continuing upwardly and away from said impeller, and having side walls at the lateral edges of said outer wall and disposed alongside the sides of the row of blades, respectively, and having a discharge opening at its outer end;
    said impeller being open at one side of said row of impeller blades along the lower portion of said row of impeller blades and said lower portion being in alignment, in a direction generally parallel to the axis of rotation of the impeller, with at least a portion of said other of the openings so that said air and suspended material are discharged from said other of the openings and directed laterally of said row of impeller blades toward and between the blades at said lower portion of the row so as to be engaged by the blades and thrown outwardly from the axis of rotation thereof by centrifugal force; and
    container supporting means movable with the chassis and positioned for holding a container in position for receiving material discharged from the chute.

2. The structure according to claim 1 wherein the chute is an open sided inverted trough throughout substantially its entire length.

3. A structure according to claim 1 wherein said one opening is located relative to the cutting means so that an outer peripheral portion of the path of the cutting means in which the cutting means is traveling toward the rear of the housing passes closer to said one opening than does any other peripheral portion of the path of the cutting means in which the cutting means is traveling toward the front of the housing, and the other of said openings is located relative to the cutting means so that an outer peripheral portion of the cutting means in which the cutting means is traveling toward the front of the housing passes closer to the said other opening than does any peripheral portion of the path of the cutting means in which the cutting means is traveling toward the rear of the housing.

4. A structure according to claim 1 wherein a damper is provided which is settable to change the effective size of only said one of the discharge openings which discharges directly to the atmosphere for proportioning said portions of said mixture discharged through said openings, respectively.

5. The structure according to claim 1 wherein the rotary cutting means comprises two cutting blades rotatable in the same direction about upright axes, respectively, which axes are spaced apart from each other laterally of the housing, one forwardly from the other;

said discharge openings are at opposite sides of the housing, said one opening being near the front of the housing and near to the portion of the path of rotation of one of the cutting blades wherein said one of the cutting blades is traveling toward the rear of the housing, and said other opening is near to the rear of the housing and near to the portion of the path of the other of said blades wherein said other of said blades is traveling toward the front of the housing.

6. The structure according to claim 1 wherein the end of the impeller is spaced, in a direction parallel to its axis of rotation, from said other discharge opening, and the discharge path between said other discharge opening and the lower portion of the path of the impeller blades through said space is unconfined peripherally so that the material discharged from said other discharge opening and passing to the impeller blades passes through the open air outside of said housing.

7. The structure according to claim 1 wherein the openings are at opposite sides of the central portion of the swath cutting pattern of the cutting means.

8. The structure according to claim 1 wherein said chute and the impeller are bodily movable transversely of the impeller axis relative to the housing.

* * * * *